US 12,541,547 B2

(12) United States Patent
Schneuwly et al.

(10) Patent No.: US 12,541,547 B2
(45) Date of Patent: Feb. 3, 2026

(54) PROFILE-ENRICHED EXPLANATIONS OF DATA-DRIVEN MODELS

(71) Applicant: Oracle International Corporation, Redwood Shores, CA (US)

(72) Inventors: Arno Schneuwly, Effretikon (CH); Desislava Wagenknecht-Dimitrova, Kanton Bern (CH); Felix Schmidt, Baden-Dattwil (CH); Marija Nikolic, Zurich (CH); Matteo Casserini, Zurich (CH); Milos Vasic, Zurich (CH); Renata Khasanova, Zurich (CH)

(73) Assignee: Oracle International Corporation, Redwood Shores, CA (US)

( * ) Notice: Subject to any disclaimer, the term of this patent is extended or adjusted under 35 U.S.C. 154(b) by 30 days.

(21) Appl. No.: 18/203,195

(22) Filed: May 30, 2023

(65) Prior Publication Data

US 2024/0126798 A1    Apr. 18, 2024

(51) Int. Cl.
*G06F 16/34* (2025.01)
*G06F 16/335* (2019.01)
*G06F 40/186* (2020.01)

(52) U.S. Cl.
CPC .......... *G06F 16/345* (2019.01); *G06F 16/335* (2019.01); *G06F 40/186* (2020.01)

(58) Field of Classification Search
CPC ..... G06F 16/345; G06F 16/355; G06F 40/186
USPC ........................................................ 707/722
See application file for complete search history.

(56) References Cited

U.S. PATENT DOCUMENTS

| | | | | |
|---|---|---|---|---|
| 9,317,829 | B2 * | 4/2016 | Anand | G06F 16/35 |
| 11,693,850 | B1 * | 7/2023 | Agarwal | G06F 16/244 |
| | | | | 707/722 |
| 11,726,990 | B2 * | 8/2023 | Dwivedi | G06F 16/258 |
| | | | | 707/722 |
| 2019/0102843 | A1 * | 4/2019 | Ichihara | G06F 16/1815 |

(Continued)

OTHER PUBLICATIONS

Kanoje, Sumitkumar, et al., "User Profiling Trends, Techniques and Applications", Intl Journ of Adv Foundtn and Research in Computer (IJAFRC), vol. 1, Issue 1, Jan. 2014, https://doi.org/10.48550/arXiv.1503.07474, 6pgs.

(Continued)

*Primary Examiner* — Robert W Beausoliel, Jr.
*Assistant Examiner* — Lauren Zannah Ganger
(74) *Attorney, Agent, or Firm* — Hickman Becker Bingham Ledesma LLP (57) ABSTRACT

In an embodiment, a computer stores, in memory or storage, many explanation profiles, many log entries, and definitions of many features that log entries contain. Some features may contain a logic statement such as a database query, and these are specially aggregated based on similarity. Based on the entity specified by an explanation profile, statistics are materialized for some or all features. Statistics calculation may be based on scheduled batches of log entries or a stream of live log entries. At runtime, an inference that is based on a new log entry is received. Based on an entity specified in the new log entry, a particular explanation profile is dynamically selected. Based on the new log entry and statistics of features for the selected explanation profile, a local explanation of the inference is generated. In an embodiment, an explanation text template is used to generate the local explanation.

20 Claims, 6 Drawing Sheets

(56) References Cited

U.S. PATENT DOCUMENTS

| | | | | |
|---|---|---|---|---|
| 2023/0092702 A1* | 3/2023 | Mao | ...................... | G06F 16/383 |
| | | | | 704/9 |
| 2023/0308472 A1* | 9/2023 | Boyer | ..................... | G06F 40/40 |

OTHER PUBLICATIONS

An, Jinwon, et al., "Variational Autoencoder Based Anomaly Detection Using Reconstruction Probability", SNU Data Mining Center, Special Lecture on IE 2.1, http://dm.snu.ac.kr/static/docs/TR/SNUDM-TR-2015-03.pdf, Dec. 27, 2015, pp. 1-18.

Bach, Sebastian, et al., "On Pixel-Wise Explanations For Non-Linear Classifier Decisions By Layer-Wise Relevance Propagation", PLOS One 10.7, 2015, doi: 10.1371/journal.pone.0130140, published Jul. 10, 2015, 46pgs.

Bastani, Osbert, et al., "Interpreting Blackbox Models via Model Extraction", https://doi.org/10.48550/arXiv.1705.08504, May 23, 2017, 20pgs.

Bau, David, et al. "Network dissection: Quantifying Interpretability of Deep Visual Representations", 2017 IEEE Conf on Comp Vision and Pattern Recogntn (CVPR), pp. 3319-3327, doi: 10.1109/CVPR.2017.354, Apr. 19, 2017, 9pgs.

Bien, Jacob, et al., "Prototype selection for interpretable classification," The Annals of Applied Statistics, vol. 5, No. 4, 2011, pp. 2403-2424, doi: 10.1214/11-AOAS495, Dec. 2011, 22pgs.

Bloedorn, Eric, et al., "Machine Learning of User Profiles: Representational Issues", AAAI/IAAI, vol. 1, pp. 433-438, https://arxiv.org/pdf/cmp-lg/9712002v1.pdf, Aug. 4, 1996, 6pgs.

Bojanowski, Piotr, et al. "Enriching Word Vectors with Subword Information", Transactns of the assoctn for comptnl linguistics, vol. 5, pp. 135-146, https://doi.org/10.48550/arXiv.1607.04606, Jun. 2017, 12pgs.

Bosnić, Zoran, et al. "Enhancing Data Stream Predictions with Reliability Estimators and Explanation", Engineering Applications of AI, vol. 34, 2014, pp. 178-192, https://doi.org/10.1016/j.engappai.2014.06.001, Sep. 2014, 15pgs.

Brown, Tom, et al., "Language Models are Few-Shot Learners", Advances in neural information processing systems vol. 33, NeurIPS 2020, pp. 1877-1901, https://doi.org/10.48550/arXiv.2005.14165, May 2020, 25pgs.

Chowdhary, K. R., "Natural Language Processing", Fundamentals of artificial intelligence 2020, Chapter 19, pp. 603-649, https://doi.org/10.1007/978-81-322-3972-7_19, Apr. 5, 2020, 47pgs.

Farid, Marina, et al., "User Profiling Approaches, Modeling, and Personalization", ACM INFOS conf, INFOS'18, Article 4, https://doi.org/10.1145/1234567890, Dec. 2018, 7pgs.

Agarap, Abien Fred, "Deep Learning Using Rectified Linear Units (ReLU)", https://doi.org/10.48550/arXiv.1803.08375, Mar. 22, 2018, 7pgs.

Haug, Johannes, et al. "Change Detection for Local Explainability in Evolving Data Streams", 31st ACM Intl Conf on Informtn & Knowledge Mgmt, CIKM'22, https://doi.org/10.1145/3511808.3557257, pp. 706-716, Sep. 6, 2022, 11pgs.

Tan, Sarah, et al., "Tree Space Prototypes: Another Look at Making Tree Ensembles Interpretable", Proceedings of the 2020 ACM-IMS on Foundtns of Data Science Conf FODS '20, https://doi.org/10.1145/3412815.3416893, pp. 23-34, Oct. 19-20, 2020, 12pgs.

Kascenas, Antanas, et al., "Denoising autoencoders for Unsupervised Anomaly Detection in Brain MRI", PMLR, 2022, vol. 172, pp. 653-664, https://proceedings.mlr.press/v172/kascenas22a/kascenas22a.pdf, 2022, 12pgs.

Kingma, Diederik P., et al., "Adam: A Method for Stochastic Optimization", https://doi.org/10.48550/arXiv.1412.6980, Dec. 22, 2014, 9pgs.

Lundberg, Scott M., et al., "A Unified Approach to Interpreting Model Predictions", NIPS '17, Advances in Neural Information Processing Sys, vol. 30, https://doi.org/10.48550/arXiv.1705.07874, May 2017, 10pgs.

Mu, Jesse, et al., "Compositional Explanations of Neurons", Advances in Neural Informtn Processing Sys, vol. 33, NIPS'20, Art No. 1439, pp. 17153-17163, https://dl.acm.org/doi/pdf/10.5555/3495724.3497163, Dec. 6, 2020, 11pgs.

MySQL 8.0 Reference Manual [Online], https://dev.mysql.com/doc/refman/8.0/en/audit-log-file-formats.html, 32pgs.

Pruthi, Garima, et al. "Estimating Training Data Influence by Tracing Gradient Descent," NeurIPS 2020, Advances in Neural Informtn Procssng Sys, vol. 33, Art No. 1672, https://doi.org/10.48550/arXiv.2002.08484, Dec. 6, 2020, pp. 19920-19930, 11pgs.

pt-query-digest—Percona Toolkit Documentation, https://docs.percona.com/percona-toolkit/pt-query-digest.html#fingerprints, 29pgs.

Rawal, Kaivalya, et al., "Beyond Individualized Recourse: Interpretable and Interactive Summaries of Actionable Recourses", NeurIPS 2020, vol. 33, Art No. 1022, pp. 12187-12198, https://dl.acm.org/doi/pdf/10.5555/3495724.3496746, Dec. 6, 2020, 12pgs.

Ribeiro, Marco Tulio, et al., "Model-agnostic interpretability of machine learning", https://doi.org/10.48550/arXiv.1606.05386, pp. 91-95, Jun. 16, 2016, 5pgs.

Ribeiro, Marco Tulio, et al., "Why Should I Trust You?" Explaining the Predictions of Any Classifier, 22nd ACM SIGKDD 2016 Intl Conf on Knowledge Discovery and Data Mining, http://dx.doi.org/10.1145/2939672.2939778, Aug. 9, 2016, 10pgs.

Roberts, Margaret E., et al., "The Structural Topic Model and Applied Social Science", NIPS 2013, vol. 4, No. 1, https://bstewart.scholar.princeton.edu/publications/structural-topic-model-and-applied-social-science, 2013, 4pgs.

Foltz, Peter W., "Latent Semantic Analysis for Text-Based Research", Behavior Research Methods, Instruments, & Computers vol. 28, Issue No. 2, pp. 197-202, 1996 Psychonomic Society, Inc., https://link.springer.com/content/pdf/10.3758/BF03204765.pdf, 6pgs.

* cited by examiner

PROFILE-ENRICHED EXPLANATIONS OF DATA-DRIVEN MODELS

FIELD OF THE INVENTION

The present invention relates to machine learning explainability (MLX). By novel operation of a dynamically selected explanation profile, herein is generation and display of a local explanation of an inferred database security anomaly.

BACKGROUND

Machine learning (ML) and deep learning are becoming ubiquitous for two main reasons: their ability to solve complex problems in a variety of different domains and growth in performance and efficiency of modern computing resources. However, as the complexity of problems continues to increase, so too does the complexity of the ML models applied to these problems.

Explaining and interpreting the results from complex ML models is a challenging task. For example, a decision tree may perform binary classification based on N input features. During training, the features that have the largest impact on the class predictions are inserted near the root of the tree, while the features that have less impact on class predictions fall near the leaves of the tree. Feature importance can be directly determined by measuring the distance of a decision node to the root of the decision tree.

Such models are often referred to as being inherently interpretable. However, as the complexity of the model increases (e.g., the number of features or the depth of the decision tree increases), it becomes increasingly challenging to interpret an explanation for a model inference. Similarly, even relatively simple neural networks with a few layers can be challenging to interpret, as multiple layers combine the effects of features and increase the number of operations between the model inputs and outputs. Consequently, there is a requirement for innovative techniques to aid with the interpretation of complex ML and deep learning models.

ML algorithms are constantly evolving, allowing businesses to effectively gain insights from raw data, automate decision processes, and strengthen business offerings. An important aspect of ML is explainability, the process of explaining to a human why and how an ML model made a decision. It is the process of helping non-expert human users understand the outcomes of a machine learning model. ML explainability (MLX) improves transparency, persuasiveness, effectiveness, and trustworthiness of ML solutions, and increases user satisfaction. MLX also facilitates ML practitioners to diagnose, debug, and refine ML algorithms.

MLX can be broadly categorized into local and global explainability:
  Local: Explain why an ML model made a specific prediction corresponding to a given sample to answer a question such as why did the ML model make a specific prediction.
  Global: Understand the general behavior of the ML model as a whole to answer questions such as how does the ML model work or what did the ML model learn from training data.

State of the art generation of a local explanation may entail time and space intensive multidimensional activities such as neighborhood exploration with clustering or with counterfactuals generated by perturbation or by an adversarial model. Some MLX techniques do not work without a supervised (i.e. labeled) training corpus.

Explaining the outcome of an ML-based solution is not trivial. MLX solutions that focus on relating ML outcomes to ML inputs fail to consider the broader context available in the input data, such as temporal or spatial adjacency of data points, recency of data, and data (i.e. concept) drift. State of the art MLX typically needs a stationary environment in which the predictive model has been trained and remains stable. As a result, it is often unclear how local attributions behave in realistic, constantly evolving settings such as streaming and online (i.e. live) applications.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The present invention relates to machine learning (ML) explainability (MLX). By novel operation of a dynamically selected explanation profile, herein is generation and display of a local explanation of an inference such as an inferred database security anomaly. This approach is highly stable and provides constant runtime complexity, model agnostic, local explaining for MLX. This is the first profile-based explanation technique.

Important local MLX use cases are interactive and do not tolerate latency well. Customer experience (CX) may be at stake. For example, local MLX may be used during a phone conversation such as with a support or sales agent. Optimizing the above concerns and criteria is expensive with high dimensional datasets having many constituent datatypes.

Various software programs and hardware devices may generate various diagnostic logs and audit logs such as logfiles, console output, and database records, all of which provide feature-rich log entries that may be archived, batched, or streamed live. Downstream applications and ML models may receive and process log entries to generate learned inferences that are difficult to explain. Herein is materialization (e.g. precomputation) of statistics of the features of the log entries. MLX may use precomputed explanatory statistics for acceleration.

An explanation profile is a novel data structure for MLX. An explanation profile may specify: a) which features to calculate explanatory statistics for, b) which log entries to include for statistics calculations, and c) which explanation text template to use for generating a human-readable local explanation.

As an example of different explanation profiles for different downstream database security applications, a feature for connection count is important if the goal is detecting distributed denial of service attacks but irrelevant for user classification based on accesses to sensitive data. Explanation profiles can include information available in log entries or may be enriched with external data. That flexibility of integrating different information sources allows tuning the size and utility of profiles depending on the problem at hand. Explanation profiles can also include temporal aspects. If an ML model targets identifying sequences of actions (e.g., usual sequences of database statements performed by a user), the profiles should support temporal aspects in order to be able to explain model inferences. Another reason for the explanation profile to capture temporal information is in case the ML model focuses on the normal hours in which an administrative account interacts with the database, which can help expose rogue accounts. Whereas if the ML model instead focuses on protecting access to sensitive data, when the data is accessed and in what sequence may be of less importance and what matters the most is who has accessed it.

Explanation profiles can also be designed at different granularities or aggregations such as at an individual or group level. Individual profiles capture the aspects of a single entity. Group profiles capture the behavior of a group of entities such as a cluster of hosts associated with a same tenant or all application hosts running in a region. Group profiles do not reflect individual behaviors but instead reflect common patterns that could be either a cross-section of common behavior or a larger pool that includes the behavior of all individual entities in the group.

This approach is novel in at least the following ways. This is the first use of profiles for explainability purposes, and it provides an intuitive explanation in the context of input data. Additionally, templatized fingerprints of logged database statements are used in a novel way to generate a local explanation and to pre-calculate statistics for inclusion in that local explanation. Fingerprints emphasize the structure of a database statement, which is may be an important factor in a downstream application such as anomaly detection. The methodology for building profiles however is not limited to structured query language (SQL) and can be extended to other programming languages or domains as well, such as network traffic or regulatory compliance. Another novel aspect is templatized explanation generation to ensure human-friendly (i.e. intuitive and ergonomic) output.

Technical improvements provided by this approach confer the following ergonomic advantages over the state of the art.

Operations context: An explanation profile provides a wider context to an inference about a log entry because the profile's statistics cover past behavior. While state of the art explainability solutions merely trace an outcome back to an input event and its attributes, explanation profiles establish context (spatial and/or temporal) of an event, and that context (i.e. profile statistics) has immense explanatory power.

Alert fatigue: For anomaly detection, an explanation profile helps with subsequent risk analysis of the anomaly and helps prevent negative human factors such as alert fatigue.

Time savings: Because explanation profiles are intuitive summaries of data, they can help cybersecurity professionals to triage and investigate a possible incident thus increasing efficiency. Instead of having to consult the team that produced the alert or the team owning the product, security specialist may directly receive assisting information as part of the explanation profile for the selected activities of interest. While investigative follow ups may still be needed, that need is decreased.

Trust in ML solutions: Explanation profiles facilitate increasing trust into ML model decisions since they build upon input data and are easy to understand.

Technical improvements provided by this approach confer the following technical advantages over the state of the art.

Data drift: Explanation profiles represent summaries of input data and can readily support streaming (i.e. live) applications, which the state of the art cannot. This is done by providing clear information that, for example, an activity is marked as anomalous because the associated user has never performed it previously. This approach helps distinguish a transient spike or a stray action from a trend and may help cope with data drift (i.e. trend) scenarios, which provides a big advantage to this profile-based approach when considering that security detections are not a one-off event but a continuous process on evolving infrastructures. In other words this approach facilitates not only alerting of exceptions, but also ongoing monitoring of workload and throughput.

Reduced size: A particular advantage of explanation profiles is the use of templatized fingerprints of SQL queries, that limit the cardinality of any logged feature that contains SQL.

Model and application agnosticism: Explanation profiles are a model-agnostic method and can adapt to: a) different domains such as network traffic data and programming languages, b) different ML architectures such as autoencoder, random forest, or opaque (i.e. black box), and c) different ML functions such as classification or numeric regression. That makes explanation profiles a powerful tool for a wide range of ML tasks in cybersecurity and elsewhere.

In an embodiment, a computer stores, in memory or storage, many explanation profiles, many log entries, and definitions of many features that log entries contain. Some features may contain a logic statement such as a database query, and these are specially aggregated based on similarity. Based on the entity specified by an explanation profile, statistics are materialized for some or all features. Statistics calculation may be based on scheduled batches of log entries or a stream of live log entries. At runtime, an inference that is based on a new log entry is received. Based on an entity specified in the new log entry, a particular explanation profile is dynamically selected. Based on the new log entry and statistics of features for the selected explanation profile, a local explanation of the inference is generated. In an embodiment, an explanation text template is used to generate the local explanation.

1.0 First Example Computer

Figure 1:
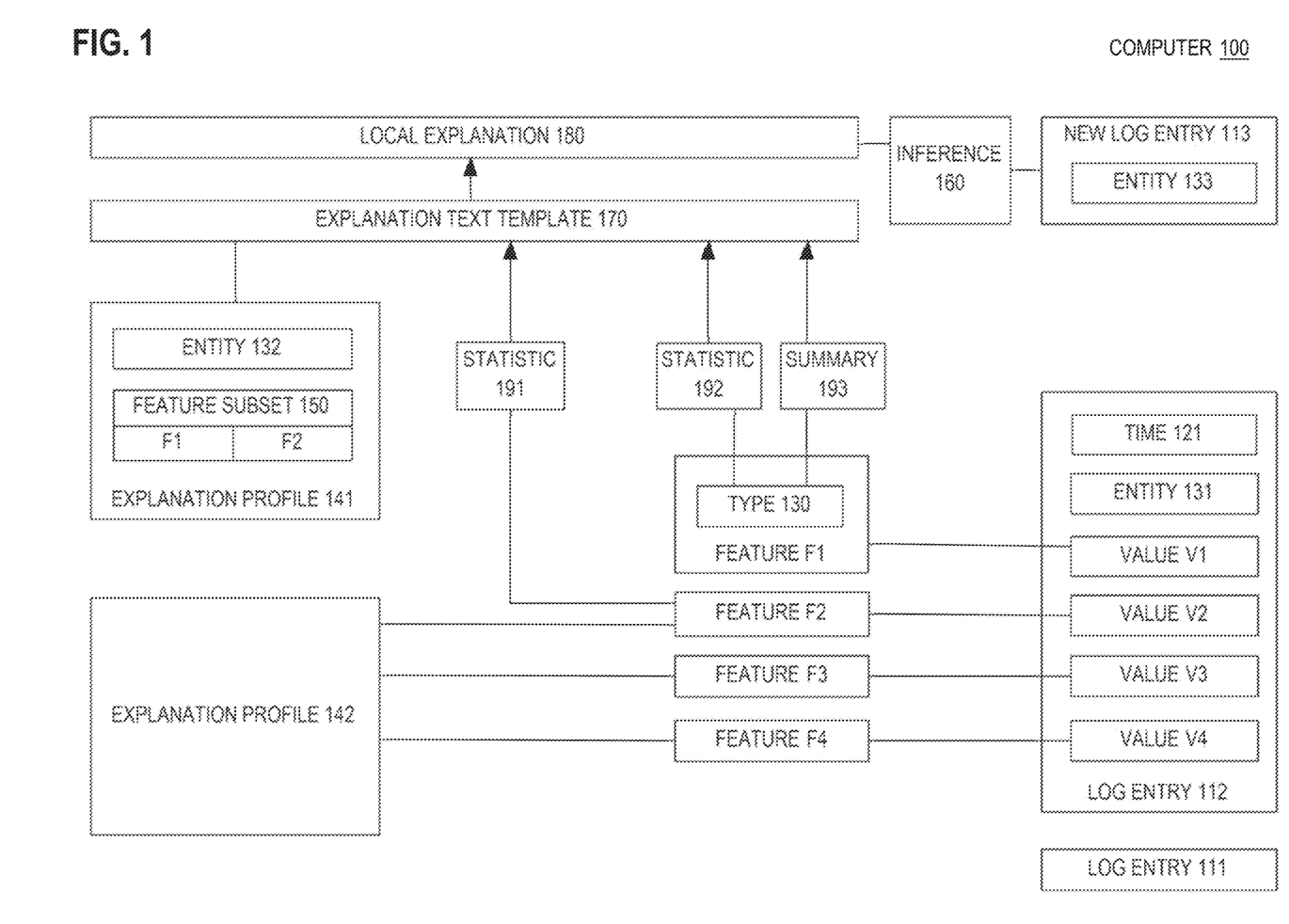
FIG. 1 is a block diagram that depicts an example computer that provides machine learning (ML) explainability (MLX), including novel operation of a dynamically selected explanation profile, to generate a local explanation of an inference that may, for example, be a detected database security anomaly.

FIG. 1 is a block diagram that depicts an example computer 100, in an embodiment. Computer 100 provides machine learning (ML) explainability (MLX), including novel operation of dynamically selected explanation profile 141, to generate local explanation 180 of inference 160 that may, for example, be a detected database security anomaly. Computer 100 may be one or more of a rack server such as a blade, a personal computer, a mainframe, a virtual computer, or other computing device.

Operation of computer 100 may entail a materialization phase followed by an explanation phase. Either phase may be independently repeated. Materialization may be periodic such as scheduled or batched, and explaining may be interactively initiated. In an embodiment, materialization processes a continuous stream that is more or less live. Whether stream or batch, many log entries 111-112 participate as follows.

1.1 Log Entries and Features

The purpose of materialization is to generate or refresh summaries 191-193 that reflect respective subsets of the many log entries 111-112. Each of summaries 191-193 may be a numeric statistic such as statistics 191-192 or a symbolic (i.e. non-numeric discrete) value such as summary 193 such as a class or categorical value such as a Boolean as discussed later herein. Any of summaries 191-193 may also be referred to as a summary value or a summary variable.

Log entries 111-112 may be: respective records (i.e. rows) in a database table, respective lines of text in a console output log, or respective semi-structured documents or objects such as JavaScript object notation (JSON) or extensible markup language (XML). Oracle and MySQL have a respective proprietary XML audit log format. In various Oracle embodiments having an XML log, log entries 111-112 may be respective distinct <entry> elements or respective distinct <record> elements. In a MySQL embodiment having an XML log, log entries 111-112 may be respective distinct <AUDIT_RECORD> elements. Example XML and JSON log formats and example log entries (i.e. audit records) for MySQL are presented in MySQL 8.0 reference manual section "6.4.5.4 Audit Log File Formats" that is incorporated in its entirety herein and available at https://dev.mysql.com/doc/refman/8.0/en/audit-log-file-formats.html Each log entry contains a separate value for each of features F1-F4. For example, log entry 112 contains values V1-V4 respectively for features F1-F4. Example features include a count of database connections or a detail of an event such as a new connection to a database or authentication of a user.

Each feature has a respective type, and multiple features may have the same type. For example, feature F1 has type 130 that may be numeric, categoric or, as discussed later herein, logic statement. Example kinds of logic statement are a database statement such as structured query language (SQL) or a JavaScript function body (e.g. definition) in a webpage. Materialization may calculate statistic(s) for each feature based on the type of the feature. For example, a numeric feature may have statistics such as minimum, maximum, mean, mode, and variance. Any feature type may have a frequency statistic such as a histogram. Other quantitative statistics may include skewness and kurtosis.

When two features have a same type, the same statistics are separately calculated for both features. For example, two features having a same numeric type should have separate variances. In an embodiment, time and space of materialization is conserved by including only features referenced by at least one of explanation profiles 141-142.

1.2 Deployment Topology

As discussed above, operation also has an explanation phase, which is when explanation profile 141 is dynamically selected to generate local explanation 180 that explains inference 160 that characterizes new (e.g. live) log entry 113. Inference 160 may be a (e.g. binary) classification or a numeric regression such as a score, a probability, or a quantity. Inference 160 is based on new log entry 113 and, in an embodiment, inference 160 was generated by a machine learning model that accepted as input a feature vector that contained values for some or all of features F1-F4.

In an embodiment, log entries 111-112 are processed by multiple downstream applications that contain respective machine learning models. Each application or model may accept a respective subset of features F1-F4 because some features may be irrelevant (i.e. noise) to some application models. Each model may generate its own kind (e.g. classification or regression) of inference. Which kind is inference 160 depends on which model generated inference 160.

In an embodiment, explanation profile 141 may be associated with a particular downstream application that generates a particular kind of inference 160, and explanation profile 141 may be based on that particular kind of inference. In an embodiment, explanation profile 141 identifies feature subset 150 that consists of features F1-F2 that are a subset of features F1-F4. Horizontal lines indicate that the feature subset of other explanation profile 142 consists of features F2-F4. As discussed above, the feature vector of a downstream model may exclude irrelevant features and, in an embodiment, feature subset 150 is or is a subset of the features included in the feature vector. In an embodiment, a domain (e.g. security) expert may painstakingly predetermine feature subset 150.

1.3 Statistics Materialization

Example statistics include counts such as of bytes received, bytes sent, table rows accessed, or table rows transferred. For example, statistic calculation may entail summation.

Summaries 191-193 are based on explanation profiles but not based on kinds of inferences. Statistics calculation during materialization may occur as follows.

Feature subset 150 identifies which features should have statistics materialized for explanation profile 141. In an embodiment, a configurable duration limits which log entries are used to calculate statistics for explanation profile 141. For example if time 121 in log entry 112 is older than a configured duration before the current time, then log entry 112 is excluded from statistics for explanation profile 141. In an embodiment, there are no log entries older than the configurable duration because those log entries are not retained.

1.4 Profiled Entity

Entity 132 specifies a subject of interest, and only log entries that involve entity 132 are included in statistics for explanation profile 141. Example entities include a user, a role, a group, a geographic region, a software application, a database table, a database column, and a time range.

A log entry may specify zero or more entities. For example if entity 131 in log entry 112 is the same as entity 132 in explanation profile 141, then log entry 112 is included in statistics for explanation profile 141. More precisely, a log entry is included in statistics for an explanation profile only if both: a) the log entry specifies the same entity as the explanation profile and b) the time of the log entry is not more than a configured duration older than the current time.

1.5 Local Explanation

As discussed above, operation also has an explanation phase, which is when explanation profile 141 is dynamically selected to generate local explanation 180 that explains inference 160 that characterizes new log entry 113. In an embodiment, dynamic selection of explanation profile(s) for one inference 160 is based on entity 133 specified in new log entry 113. For example, entity 133 in new log entry 113 may be the same as entity 132 in explanation profile 141.

New log entry 113 may specify multiple entities that may match multiple respective explanation profiles. In that case, a separate local explanation is generated for each selected explanation profile. Local explanation generation may occur as follows.

In an embodiment, selected explanation profile 141 identifies explanation text template 170 that is a skeletal (i.e. incomplete) explanation that is reusable text for generating local explanations. Each explanation profile may identify a distinct explanation text template.

For example, explanation text template 170 may contain identified placeholders into which identified values may be inserted (i.e. filled in) to generate local explanation 180. Values dynamically inserted into explanation text template 170 may include summaries 191-193, inference 160, and values from new log entry 113 such as values of features F1-F4.

By design, explanation text template 170 has placeholders only for values likely to be relevant to local explanation 180. For example, the same human expert who handcrafts explanation profile 141 may also handcraft explanation text template 170. For example, explanation text template 170 may have a placeholder for statistic 192 but not for summary 193, and may have a placeholder for new log entry 113's value for features F1-F2 but not features F3-F4. In an embodiment, explanation text template 170 does not have placeholders for features not in feature subset 150.

2.0 Second Example Computer

Figure 2:
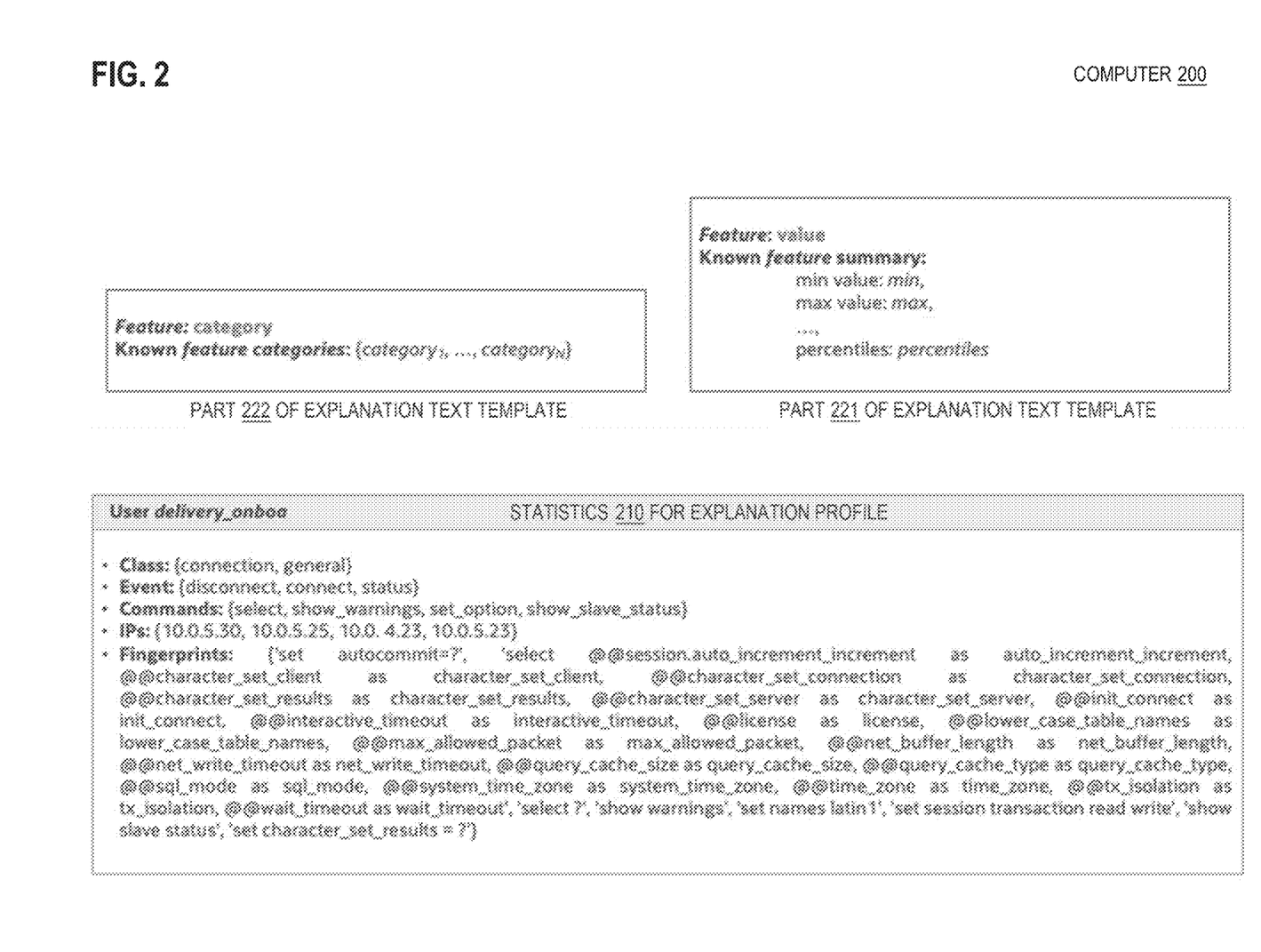
FIG. 2 is a block diagram that depicts an example computer that materializes statistics for an explanation profile.

FIG. 2 is a block diagram that depicts an example computer 200 that may be a nonlimiting implementation of computer 100. Computer 200 materializes statistics 210 for an explanation profile such as explanation profile 141. For example, statistics 210 may include summaries 191-193 To generate a local explanation such as local explanation 180 based on statistics 210, computer 200 uses parts 221-222 of an explanation text template such as explanation text template 170. For example, various subsets of many reusable parts 221-222 may be combined in different ways to create different explanation text templates for different explanation profiles.

In this example, statistics 210 are materialized for explanation profile 141, and the top of statistics 210 says "User" that means that entity 132 is a particular user account such as for a database user. Shown in statistics 210 is a vertical bullet list of features in feature subset 150. All of these features have various respective categoric types.

For example, the shown event feature has a categoric type whose shown comma-separated members are disconnect, connect, and status. Statistics 210 may contain a frequency histogram for each categoric feature, and the histogram may have a distinct bin for each member of the category. A frequency histogram may provide additional statistics such as mode (i.e. histogram bin with highest frequency), potential cardinality (i.e. count of bins), and actual cardinality (count of non-empty bins).

More precisely, the shown fingerprints feature's type is database statement, and matching a corpus of many database statements to a few statement fingerprints, which each is a textual template that is not an explanation text templates), provides a finite set of fingerprints. The shown finite set of fingerprints may be treated as a categoric feature as discussed earlier herein, where each distinct fingerprint is a distinct value in the category.

The shown question marks in the fingerprints feature are wildcards. An actual database statement may match (i.e. have similar text) a fingerprint that has wildcards that may match any literal (e.g. number or quoted string) that might occur in that position in any similar database statement. For example, the first shown fingerprint "set autocommit=?" matches two different database statements "set autocommit=true" and "set autocommit=false", and many instances of both of those two database statements increase the histogram frequency of that one fingerprint.

In this example, parts 221-222 are parts of explanation text template 170. In this example, part 221 is for feature F1, and part 222 is for feature F2. As shown, part 222 says "Feature: category" in which the word "category" is a placeholder as discussed earlier herein into which the categorical value of feature F2 of new log entry 113 may be dynamically inserted while generating local explanation 180. As shown, part 222 says "Known feature categories: {category1, . . . , categoryN}" in which the string "{category1, . . . , categoryN}" is a placeholder into which is inserted only distinct categorical value(s) that actually (i.e. not potentially) occurred in log entries that were included during materialization for an explanation profile. That placeholder for actually occurring values is populated from a statistic in statistics 210.

For example, both of explanation profiles 141-142 may be selected for same inference 160. Generated by part 222 for explanation profile 141, local explanation 180 may contain and display a frequency histogram of feature F2. For different explanation profile 142, same part 222 for same feature F2 for same inference 160 may generate a different local explanation that contains and displays a different frequency histogram due to different frequencies or different counts of bins. The bin counts may be different because explanation profiles 141-142 may specify different entities that match different subsets of log entries, in which case both subsets of log entries may have different actual cardinalities (i.e. count of distinct values; nonempty bin count) for same feature F2.

Parts 221-222 may be reused for different features that have an identical or similar type. The categoric feature type may include various similar but non-identical subtypes. For example, one kind of category may be primary colors whose members are red, yellow, and blue. Another kind of category might be traffic light colors whose members are red, yellow, and green. Another kind of category might be temperature whose members are hot and cold. Those temperature and color features may be treated as having a same categoric type despite being different categories. For example, part 222 may be reused for color and temperature features.

Part 221 is for a feature having a numeric type. As shown in part 221, "min" is a placeholder for a statistic in statistics 210 that is the minimum value that actually occurred for the feature in log entries that were included during materialization for an explanation profile. Likewise, "max" is a placeholder for a statistic in statistics 210 that is the maximum actually occurring value. As shown, part 221 says "Feature: value" in which "value" is a placeholder into which the numeric value of feature F1 of new log entry 113 may be dynamically inserted while generating local explanation 180.

As shown, part 221 says "percentiles: percentiles" in which the second "percentiles" is a placeholder for a statistic in statistics 210 that has: a) a sequence of predefined percentiles (e.g. 10%, 20%, etc. or 25%, 50%, etc.) and b) for each of those few predefined percentiles, a single respective actually occurring numeric value that is ranked at that percentile. For example if the median actually occurring value is 123.45, then the fiftieth percentile's actually occurring value is 123.45. Identifying which values correspond to which predefined percentiles may entail ranking (i.e. sorting) of all actually occurring values. Part 221 can be reused for numeric features whose subtype may be real or integer or range bounded (e.g. nonnegative or particular range).

When designing explanation text template 170, either of parts 221-222 may be used for a categoric feature whose members naturally are sequential such as January, February, March, etc. that are enumerated months of the year that may be treated as integer ordinals such as one through twelve for months. In that case, either categoric part 222 or numeric part 221 may be used in explanation text template 170 to generate local explanation 180 based on a feature whose type is month.

3.0 Example Computer Display

Figure 3:
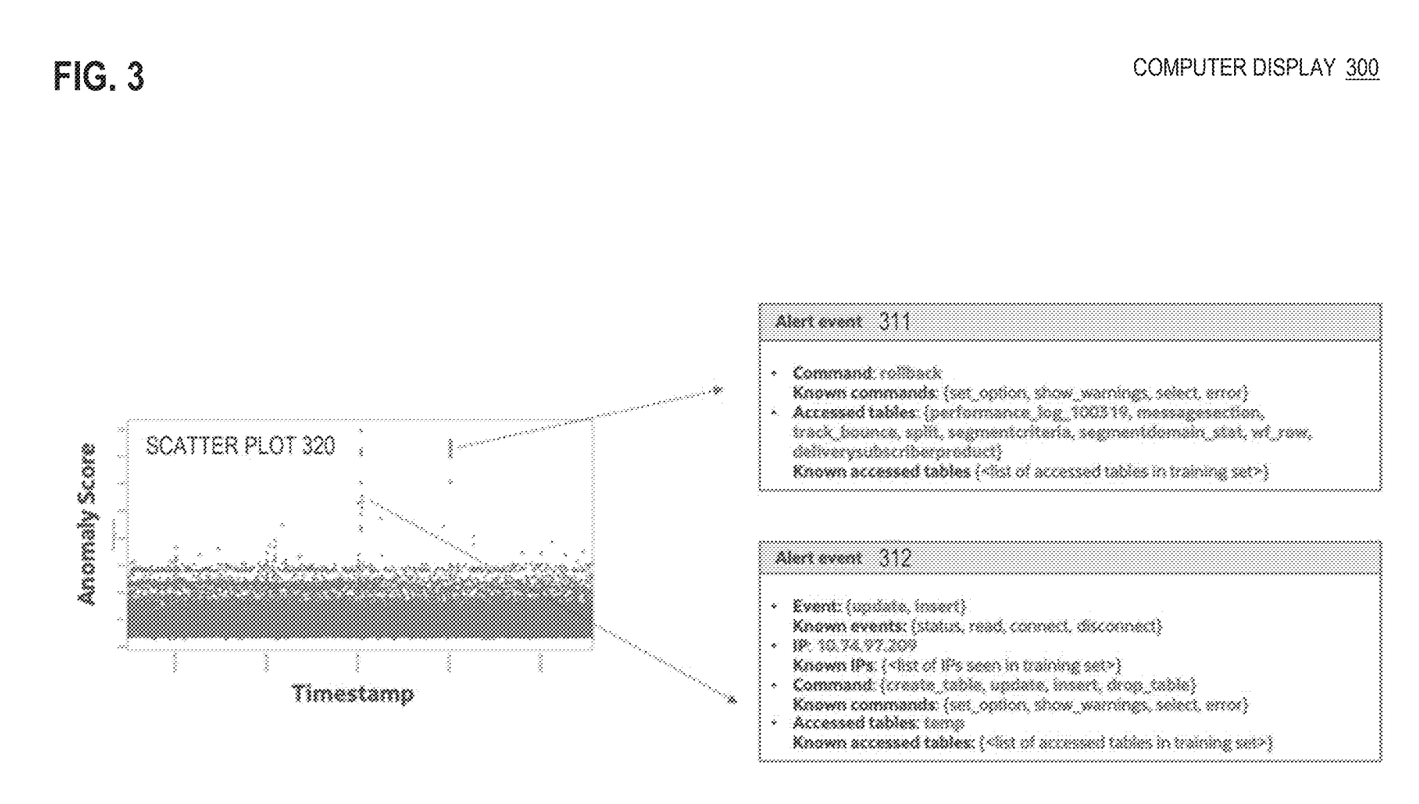
FIG. 3 is a block diagram that depicts an example computer display that displays an example scatter plot of log entries.

FIG. 3 is a block diagram that depicts an example two-dimensional computer display 300 that may be part of a computer that is a nonlimiting implementation of any computer herein. Computer display 300 displays scatter plot 320. The dependent (i.e. vertical) axis of scatter plot 320 is a scale of anomaly scores. A higher score (and higher position on the vertical axis) indicates a higher likelihood of an anomaly.

The bottom of scatter plot 320 is dense (i.e. dark) with points that are normal (i.e. non-anomalous). Each point represents a separate inference (i.e. inferred anomaly score) for a distinct log entry. For example, inference 180 for new log entry 113 may be one point on scatter plot 320.

Scatter plot 320 is interactive. Interactive selection (e.g. mouse click) of an individual point causes dynamic generation and display of a local explanation for the inference of that selected point. In an embodiment, scatter plot 320 is generated based on a particular explanation profile. In that case, all of the points in scatter plot 320 correspond to log entries that were included for materializing the statistics of that explanation profile.

One example not shown uses explanation profile 141 to generate scatter plot 320. In that case, clicking on one point in scatter plot 320 causes explanation text template 170 to generate and display local explanation 180. Explanation text template 170 may have placeholders for statistics as discussed earlier herein, and it does not matter which point is clicked on, because all of the points use the exact same statistics for explanation generation. However, different explanations are generated by clicking on different points because explanation text template 170 may have placeholders for values from the inference or the log entry of the selected point, and those values may differ for different points.

In the shown example, no explanation profile is used to generate scatter plot 320 and, instead, all points (i.e. log entries and their inferences) from a particular time range are included, regardless of which explanation profile(s) correspond to each point. When a point is interactively selected, the entity(s) specified in the log entry of the selected point are used to dynamically select explanation profile(s) that specify any of those entity(s).

For example, a first mouse click on a first point may cause dynamic selection of explanation profile 141 whose explanation text template 170 dynamically generates and displays a first local explanation shown as alert event 311. For example, the log entry of alert event 311 may specify a particular database table that is entity 132 of explanation profile 141, which causes explanation profile 141 to be dynamically selected for that interactively selected log entry.

A second mouse click on a second point may cause dynamic selection of different explanation profile 142 whose different explanation text template dynamically generates and displays a different second local explanation shown as alert event 312. For example, the log entry of alert event 312 may specify a particular database statement or fingerprint that is the entity of explanation profile 142, which causes explanation profile 142 to be dynamically selected for that interactively selected second log entry.

4.0 Example Dynamic Profile Selection for Explanation Generation

Figure 4:
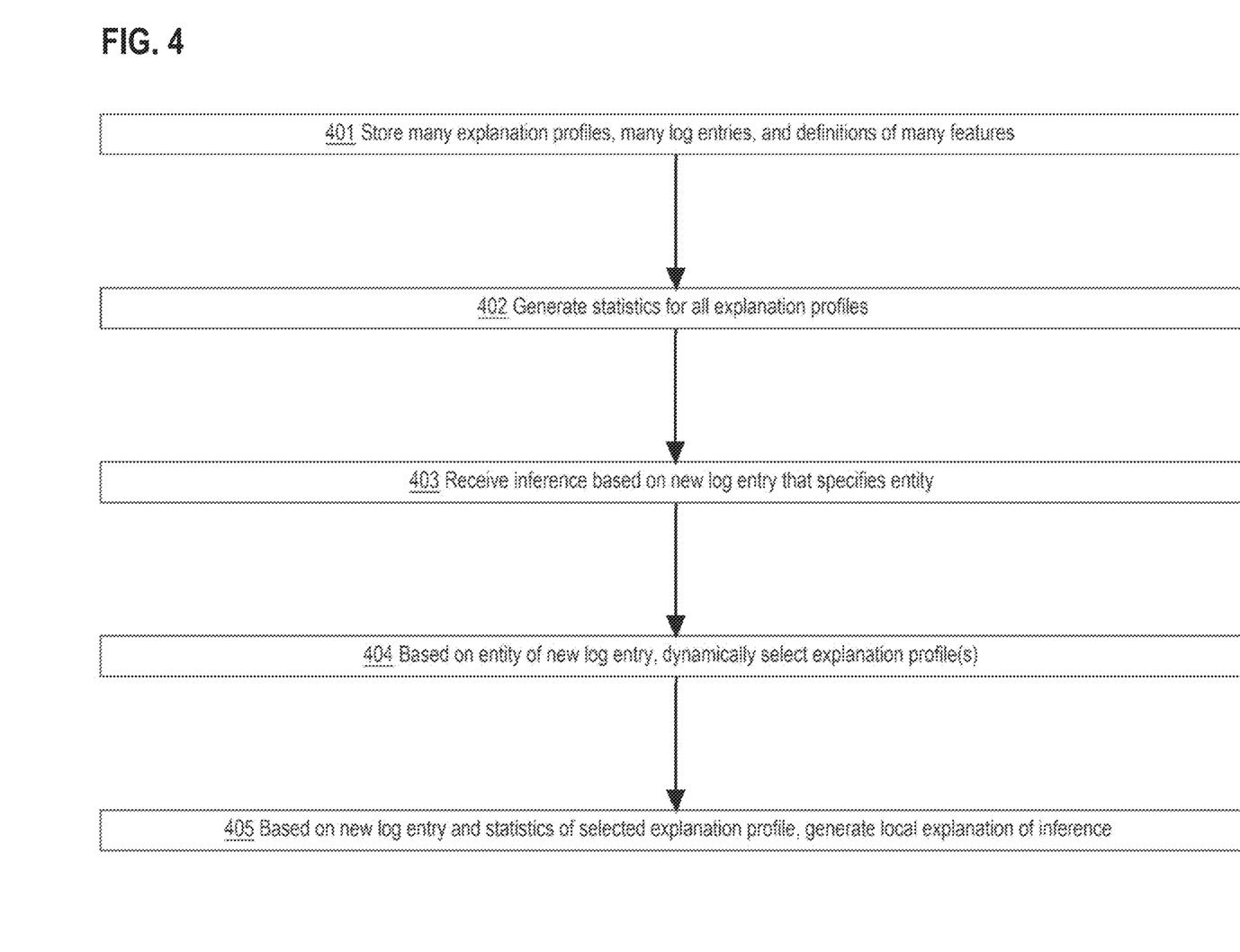
FIG. 4 is a flow diagram that depicts an example computer process that generates a local explanation based on a dynamically selected explanation profile.

FIG. 4 is a flow diagram that depicts an example process that any computer herein may perform to generate a local explanation based on a dynamically selected explanation profile. For example, computer 100 may select explanation profile 141 when generating local explanation 180 in FIG. 1. The process of FIG. 4 implements a sequence of a design phase followed by materialization and explanation phases as discussed for FIG. 1.

Design step 401 stores, in computer 100, many explanation profiles, many log entries, and definitions of many features. Explanation profiles and definitions of features are formal artifacts that computer 100 can interpret, and these artifacts may be handcrafted during design. Step 401 may store explanation profiles and definitions of features in an automation format such as JavaScript object notation (JSON) or extensible markup language (XML). Step 401 entails identifying, configuring, or integrating a source of log entries, which may entail configuring a logfile path, a database table, or a live stream.

Materialization step 402 generates statistics for all explanation profiles as discussed earlier herein. Step 402 may be periodic and scheduled to refresh the statistics.

In the explaining (i.e. runtime, e.g. interactive) phase, runtime steps 403-405 cooperate to perform machine learning explainability (MLX). The runtime phase may be interactively invoked or may be automatically triggered such as to generate a local explanation to include in an alert that may be recorded or published (e.g. as a webpage that can be bookmarked or emailed).

For example, clicking on scatter plot 320 may cause the runtime phase as discussed for FIG. 3. In this example, the runtime phase is instead caused by an inference that is a detection that a new log entry is anomalous. For example, the inference may be an inferred anomaly score that exceeds a predefined threshold.

Step 403 receives an inference based on a (e.g. new or interactively selected) log entry that specifies entity(s). Based on entity(s) of the log entry, step 404 dynamically selects explanation profile(s) that specify any of those entities as discussed earlier herein.

Generative step 405 may be repeated for each explanation profile selected by step 404, but in this example only one explanation profile is selected. Based on the inference, log entry, and statistics of the selected explanation profile, step 405 generates a local explanation of the inference as discussed earlier herein. For example, step 405 may apply the explanation text template of the selected explanation profile as discussed earlier herein.

5.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, such as Oracle Database 11g. SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, such as with shared access to a set of disk drives and data blocks stored thereon. The nodes in a multi-node database system may be in the form of a group of computers, such as work stations and/or personal computers, that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

5.1 Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
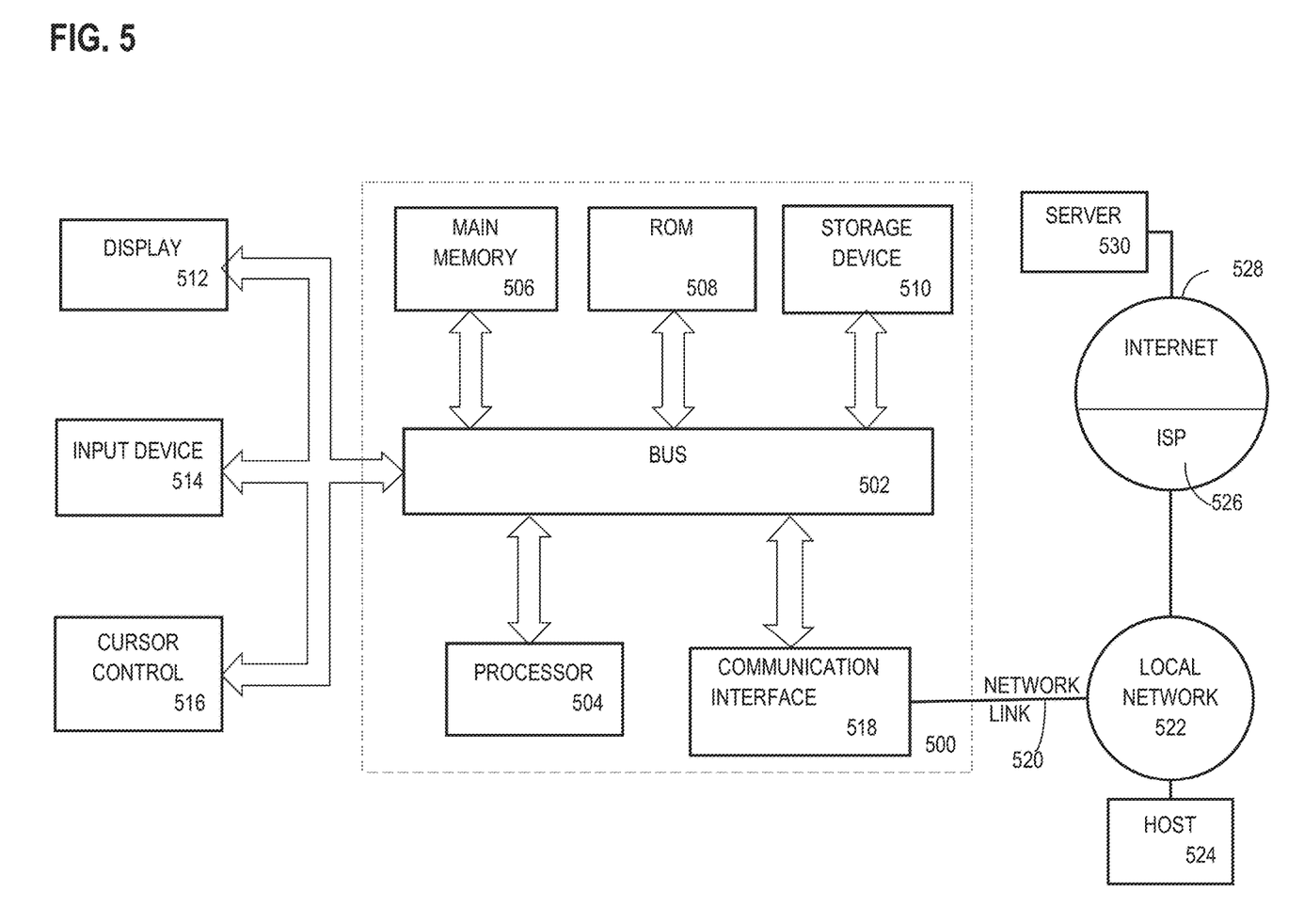
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

Figure 6:
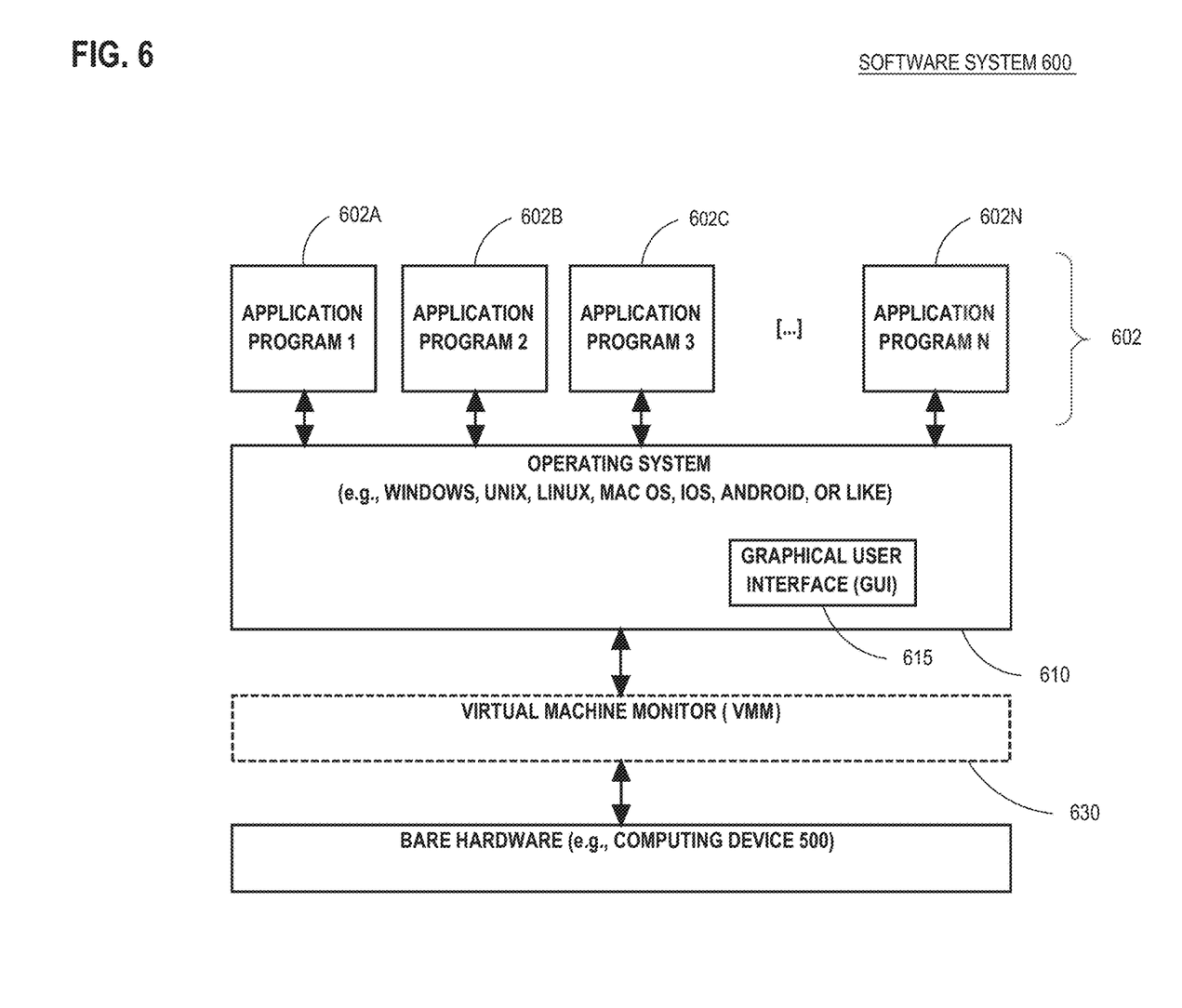
FIG. 6 is a block diagram that illustrates a basic software system that may be employed for controlling the operation of a computing system.

FIG. 6 is a block diagram of a basic software system 600 that may be employed for controlling the operation of computing system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/or serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert)

assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing:
      definitions of a plurality of features, wherein each feature in the plurality of features has a type and
      a plurality of explanation profiles, wherein each explanation profile in the plurality of explanation profiles specifies an entity and a feature subset of the plurality of features;
   receiving or storing a plurality of log entries, wherein each log entry in the plurality of log entries specifies a time, an entity, and values for the plurality of features;
   generating, for each explanation profile in the plurality of explanation profiles, based on the entity of the explanation profile, a respective summary value of each feature of the feature subset of the explanation profile that is based on said type of the feature;
   receiving an inference that is based on a new log entry that specifies an entity selected from a group consisting of: a database table, a database column, a logic statement that contains a particular value, and a textual fingerprint that contains a wildcard;
   selecting, based on the entity of the new log entry, a particular profile from the plurality of explanation profiles; and
   generating, based on the new log entry and said summary values of the feature subset of the particular profile, an explanation of the inference;
   wherein the method is performed by one or more computers.

2. The method of claim 1 wherein the new log entry further specifies a second entity selected from a group consisting of: a user, a role, a group, a geographic region, a software application, and a time range.

3. The method of claim 1 wherein the entity is a logic statement that is a database statement.

4. The method of claim 1 further comprising matching the value of a particular feature from the feature subset of the particular profile to the entity, wherein the entity is a particular fingerprint from a plurality of textual fingerprints.

5. The method of claim 4 further comprising processing the type of the particular feature as a category whose members are the plurality of textual fingerprints.

6. The method of claim 1 wherein the inference is that the new log entry is anomalous.

7. The method of claim 1 wherein the new log entry indicates at least one selected from a group consisting of a count of database connections, a new connection to a database, and authentication of a user.

8. The method of claim 1 wherein said generating the summary value of a particular feature of the feature subset of the particular profile comprises summation of one selected from a group consisting of: bytes received, bytes sent, table rows accessed, and table rows transferred.

9. The method of claim 1 wherein the summary value of a particular feature of the feature subset of the particular profile comprises at least one selected from a group consisting of a statistical mode, a histogram, skewness, and kurtosis.

10. The method of claim 1 wherein:
the particular profile specifies an explanation text template;
said generating the explanation of the inference comprises combining the explanation text template, the summary values of the feature subset of the particular profile, and values from the new log entry for the feature subset of the particular profile.

11. One or more computer-readable non-transitory media storing instructions that, when executed by one or more processors, cause:
storing:
definitions of a plurality of features, wherein each feature in the plurality of features has a type and
a plurality of explanation profiles, wherein each explanation profile in the plurality of explanation profiles specifies an entity and a feature subset of the plurality of features;
receiving or storing a plurality of log entries, wherein each log entry in the plurality of log entries specifies a time, an entity, and values for the plurality of features;
generating, for each explanation profile in the plurality of explanation profiles, based on the entity of the explanation profile, a respective summary value of each feature of the feature subset of the explanation profile that is based on said type of the feature;
receiving an inference that is based on a new log entry that specifies an entity selected from a group consisting of: a database table, a database column, a logic statement that contains a particular value, and a textual fingerprint that contains a wildcard;
selecting, based on the entity of the new log entry, a particular profile from the plurality of explanation profiles; and
generating, based on the new log entry and said summary values of the feature subset of the particular profile, an explanation of the inference.

12. The one or more computer-readable non-transitory media of claim 11 wherein the new log entry further specifies a second entity selected from a group consisting of: a user, a role, a group, a geographic region, a software application, and a time range.

13. The one or more computer-readable non-transitory media of claim 11 wherein the entity is a logic statement that is a database statement.

14. The one or more computer-readable non-transitory media of claim 11 wherein the instructions further cause matching the value of a particular feature from the feature subset of the particular profile to the entity, wherein the entity is a particular fingerprint from a plurality of textual fingerprints.

15. The one or more computer-readable non-transitory media of claim 14 wherein the instructions further cause processing the type of the particular feature as a category whose members are the plurality of textual fingerprints.

16. The one or more computer-readable non-transitory media of claim 11 wherein the inference is that the new log entry is anomalous.

17. The one or more computer-readable non-transitory media of claim 11 wherein the new log entry indicates at least one selected from a group consisting of a count of database connections, a new connection to a database, and authentication of a user.

18. The one or more computer-readable non-transitory media of claim 11 wherein said generating the summary value of a particular feature of the feature subset of the particular profile comprises summation of one selected from a group consisting of: bytes received, bytes sent, table rows accessed, and table rows transferred.

19. The one or more computer-readable non-transitory media of claim 11 wherein the summary value of a particular feature of the feature subset of the particular profile comprises at least one selected from a group consisting of a statistical mode, a histogram, skewness, and kurtosis.

20. The one or more computer-readable non-transitory media of claim 11 wherein:
the particular profile specifies an explanation text template;
said generating the explanation of the inference comprises combining the explanation text template, the summary values of the feature subset of the particular profile, and values from the new log entry for the feature subset of the particular profile.

* * * * *